United States Patent
Kang et al.

(10) Patent No.: US 10,700,344 B2
(45) Date of Patent: Jun. 30, 2020

(54) NEGATIVE ELECTRODE PLATE AND SECONDARY BATTERY COMPRISING THE SAME

(71) Applicant: Contemporary Amperex Technology Co., Limited, Ningde, Fujian (CN)

(72) Inventors: Meng Kang, Ningde (CN); Tianquan Peng, Ningde (CN); Yuliang Shen, Ningde (CN); Jiazheng Wang, Ningde (CN); Libing He, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 80 days.

(21) Appl. No.: 16/199,246

(22) Filed: Nov. 26, 2018

(65) Prior Publication Data

US 2019/0348667 A1    Nov. 14, 2019

(30) Foreign Application Priority Data

May 11, 2018    (CN) .......................... 2018 1 0453001

(51) Int. Cl.
| | |
|---|---|
| *H01M 4/133* | (2010.01) |
| *H01M 4/583* | (2010.01) |
| *H01M 10/0525* | (2010.01) |
| *H01M 10/48* | (2006.01) |
| *H01M 4/02* | (2006.01) |

(52) U.S. Cl.
CPC ........... *H01M 4/133* (2013.01); *H01M 4/583* (2013.01); *H01M 10/0525* (2013.01); *H01M 10/48* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2008/0199777 A1    8/2008    Onishi et al.

FOREIGN PATENT DOCUMENTS

| | | |
|---|---|---|
| CN | 1790799 A | 6/2006 |
| CN | 101053098 A | 10/2007 |
| CN | 101208819 A | 6/2008 |
| CN | 100464446 C | 2/2009 |
| CN | 101589492 A | 11/2009 |
| CN | 102332604 A | 1/2012 |
| CN | 103199251 A | 7/2013 |
| CN | 103782420 A | 5/2014 |
| CN | 103811716 A | 5/2014 |
| CN | 104201386 A | 12/2014 |
| CN | 105552373 A | 5/2016 |
| CN | 106611869 A | 5/2017 |
| WO | 2012086826 A1 | 6/2012 |

OTHER PUBLICATIONS

Office Action and first search report dated Jan. 7, 2019 for Chinese application No. 201810453001.X,10 pages.
Extended European Search Report for European Application No. 18208315.4, dated Apr. 11, 2019, 9 pages.

*Primary Examiner* — Sarah A. Slifka
(74) *Attorney, Agent, or Firm* — Law Offices of Liaoteng Wang

(57) ABSTRACT

The disclosure relates to a negative electrode plate and a secondary battery comprising the same. Specifically, the present disclosure provides a negative electrode plate comprising a negative electrode current collector and a negative electrode layer coated on at least one surface of the negative electrode current collector, the negative electrode layer comprising a negative electrode active material, wherein the negative electrode active material comprises a graphite material, and the negative electrode layer fulfills the condition: $0.45 \leq 7.8/D50 + 1.9*D50/(V_{OI})^2 \leq 3.1$, wherein D50 represents a volume distribution average particle diameter of particles of the negative electrode active material in micron; $V_{OI}$ represents the OI value of the negative electrode layer. The negative electrode plate can allow that a secondary battery containing the same has the combination of high energy density, fast charge, and long cycle life.

19 Claims, No Drawings

NEGATIVE ELECTRODE PLATE AND SECONDARY BATTERY COMPRISING THE SAME

CROSS-REFERENCE TO RELATED APPLICATION

This application claims priority to Chinese Patent Application No. 201810453001.X, filed on May 11, 2018, which is hereby incorporated by reference in its entirety.

TECHNICAL FIELD

The disclosure belongs to the field of electrochemical technology. More particularly, the disclosure refers to a negative electrode plate for a secondary battery and the secondary battery.

BACKGROUND

New energy vehicles represent the direction of industrial development of the world's vehicles. As a new rechargeable battery having high-voltage and high energy density, secondary battery has prominent features such as light weight, high energy density, no pollution, no memory effect, and long service life and thus is widely used in new energy vehicles.

Nevertheless, relatively long charging time is one of the important factors that limit the rapid popularization of new energy vehicles. Some power batteries with fast charge capability have been proposed in the art. However, some of these batteries provide fast charge capability by sacrificing the service life of the batteries. Such kinds of batteries are obviously not practical. Some manufacturers have introduced new energy vehicles with fast charge capability. However, most of them sacrifice the energy density of batteries to ensure the fast charge capability, while the reduced energy density of batteries will shorten the cruising range of vehicles. Therefore, a secondary battery having fast charge capability and meanwhile having high energy density is urgently needed in the vehicle field.

SUMMARY

In view of the problems in the art, it is an object of the present invention to provide a negative electrode plate and a secondary battery containing the negative electrode plate, wherein the battery can have both high energy density and fast charge capability.

In order to achieve the above object, the first aspect of the present disclosure provides a negative electrode plate, comprising a negative electrode current collector and a negative electrode layer coated on at least one surface of the negative electrode current collector, the negative electrode layer comprising negative electrode active material, wherein the negative electrode active material comprise graphite material, and the negative electrode layer fulfills the condition:

$$0.45 \leq 7.8/D50 + 1.9 \times D50/(V_{OI})^2 \leq 3.1 \qquad \text{formula I)}$$

$$\text{preferably, } 0.75 \leq 7.8/D50 + 1.9 \times D50/(V_{OI})^2 \leq 2.0 \qquad \text{formula II)}$$

wherein
D50 represents a volume distribution average particle diameter of particles of the negative electrode active material in micron;
$V_{OI}$ represents the OI value of the negative electrode layer.

The inventors have further found that the energy density and cycle life of the battery are further improved when the negative electrode active material further fulfills the condition:

$$5.3 \leq D50 \times 0.625 + G \times 3 \leq 14.5 \qquad \text{formula III)}$$

$$\text{preferably, } 6.5 \leq D50 \times 0.625 + G \times 3 \leq 12 \qquad \text{formula IV)}$$

wherein
D50 represents a volume distribution average particle diameter of particles of the negative electrode active material in micron;
G represents the degree of graphitization of the negative electrode active material.

For convenience, in the present disclosure, a kinetic parameter is defined as $A = 7.8/D50 + 1.9 \times D50/(V_{OI})^2$, and a energy density parameter is defined as $B = D50 \times 0.625 + G \times 3$, and the ratio of A/B is defined as the battery equilibrium constant K. By further studies, the inventors have found that the overall performance of battery can be further improved when the battery equilibrium constant K is in the range of from 0.055 to 0.31. Preferably, K fulfills the condition $0.112 \leq K \leq 0.26$.

In another aspect, the disclosure also provides a secondary battery, comprising the negative electrode plate according to the first aspect of the present disclosure.

DETAILED DESCRIPTION

Negative electrode plate used for a secondary battery such as a lithium ion battery is generally composed of a negative electrode current collector and a negative electrode layer coated on at least one surface of the negative electrode current collector, wherein the negative electrode layer contains a negative electrode active material and an optional additive.

The electrochemical process that occurs in a negative electrode plate during charging can be roughly divided into 3 steps:
1) Liquid phase conduction (including liquid phase diffusion and electromigration) of active ions within the porous negative electrode;
2) Charge exchange of active ions on the surface of negative electrode active material;
3) Solid phase conduction of active ions within the particles of negative electrode active material.

Through a large number of studies, the inventors have found that certain parameters of negative electrode active material and negative electrode plate have different influences on the energy density and fast charge performance of battery; when an electrode plate (pole piece) is designed, if a special design is made for these parameters, there is a chance to obtain a secondary battery that has both high energy density and fast charge characteristics.

Through a large number of experiments, the inventors have found that when a negative electrode active material and a negative electrode layer are designed, the fast charge performance of secondary battery can be greatly improved if average particle diameter (D50, μm) of the negative electrode active material and the OI value of the negative electrode layer ($V_{OI}$, also referred to as orientation index) fulfill a specific condition. Specifically, the battery can have a significantly improved kinetic performance and have a fast charge capability, if a negative electrode active material and a negative electrode layer are designed to fulfill the condition, $$0.45 \leq 7.8/D50 + 1.9 \times D50/(V_{OI})^2 \leq 3.1 \qquad \text{formula I).}$$

For convenience, a kinetic parameter A is defined as $A=7.8/D50+1.9\times D50/(V_{OI})^2$.

The above formula I is summarized by the inventors through a large number of experimental studies. The inventors have found, the fast charge capability of a battery is closely related to the particle size of negative electrode active material (which can be characterized by D50) and the active reaction sites in negative electrode layer (which can be characterized the CH value $V_{OI}$ of the negative electrode layer). Generally, the larger the particle size of the negative electrode active material, the larger the solid phase conduction resistance of the ions, and the worse the fast charge capability of the battery. During charging and discharging, the more the active reaction sites in the negative electrode layer, the faster the charge exchange of ions on the surface of the negative electrode active material during charging, and the better the fast charge performance of the battery. Based on this, the inventors have found that by skillfully adjusting the particle size of the negative electrode active material of the battery and the OI value ($V_{OI}$) of the negative electrode layer to obtain a match and a specific relationship between them, the battery can have fast charge capability without causing a deterioration of cycle performance.

Specifically, the inventors have found, the improved fast charge performance can be achieved by controlling the kinetic parameter $A=7.8/D50+1.9\times D50/(V_{OI})^2$. Here, D50 represents the average particle size of negative electrode active material, and $V_{OI}$ represents the orientation index (OI value) of negative electrode layer. The inventors have found that the number of the active reaction sites in the negative electrode layer is closely related to the OI value $V_{OI}$ of the negative electrode layer. Generally, the smaller value of $V_{OI}$ means that the negative electrode layer has sufficient end faces that can be rapidly intercalated by ions, and also means the more active reaction sites on the surface.

If the kinetic parameter A is too large, there are two possibilities: 1) D50 is too small, the adhesion of the negative electrode layer is relatively small, powders tend to fall off from layer, the conductance of electrons is affected, thus the battery kinetic performance will be impaired; 2) the OI value $V_{OI}$ of the negative electrode layer is too small, indicating that the active material tends to be disorderly arranged, and the adhesion of the negative electrode layer is bad and powders tend to fall off from layer, the electrode plate tends to wrinkle during cycle test, resulting in the deteriorated reaction interface, so that the cycle performance of the battery is deteriorated. If the kinetic parameter A is too small, there are also two possibilities: 1) D50 is too large, the solid phase diffusion is difficult, thus the fast charge function cannot be satisfied; 2) the OI value $V_{OI}$ of the negative electrode layer is too large, indicating the active material tends to be arranged in parallel to current collector, the effective ion-intercalatable end faces on the negative electrode layer is less, that is, the number of active reaction sites is relatively small, the charge exchange rate is affected, thus the demand for fast charging cannot be met. Therefore, in order to obtain a battery having the fast charge capability, it is necessary to fulfill the condition of $0.45 \leq A \leq 3.1$. The inventors have further found that the preferred range of A is $0.75 \leq A \leq 2.0$.

The inventors have further found that, under the proviso that the kinetic parameter A fulfills the condition of $0.45 \leq A \leq 3.1$ (preferably, $0.75 \leq A \leq 2.0$), if the negative electrode active material further fulfills the condition:

$$5.3 \leq D50 \times 0.625 + G \times 3 \leq 14.5 \quad \text{formula III}$$

the secondary battery may have fast charge capability and meanwhile have further improved cycle life and energy density, with better processing performance of plate.

For the sake of convenience, the energy density parameter B is defined as $B=D50\times 0.625+G\times 3$.

The inventors have found: the energy density of the battery is closely related to the particle size of the negative electrode active material and the degree of graphitization. Usually, the larger the particles of the negative electrode active material, the more the active ion-intercalatable sites. That means, the negative electrode active material has higher capacity per gram, and only relatively small amount of negative electrode active materials are required to achieve the capacity target when the battery is designed. Thus, with the larger particles of the negative electrode active material, the energy density of the battery would be more favorably increased; the higher degree of graphitization of the negative electrode active material means that the crystal structure is closer to the complete layered structure of the ideal graphite, and has fewer defects such as stacking faults and dislocations. That means, if the negative electrode active material has higher capacity per gram, only relatively small amount of the negative electrode active materials are required to achieve the capacity target when the battery is designed. Thus, with the higher degree of graphitization of the negative electrode active material, the energy density of the battery would be more favorably increased. The inventors have found that, by jointly controlling the particle size and the degree of graphitization of the negative electrode active material, the energy density and the cycle performance of the battery can be further considered and improved. Specifically, it is realized by controlling the range of the energy density parameter $B=D50\times 0.625+G\times 3$.

If the energy density parameter B is too large, there are two possibilities: 1) D50 is too large, the slurry tends to settle, bumping is likely to occur during coating with low yield, resulting in worse cycle performance; 2) the degree of graphitization is too large, the particles tend to be flat, and the structure of pores is too dense, which is not conducive to the infiltration of electrolyte and significantly reduces the cycle performance of the battery. If the energy density parameter B is too small, there are also two possibilities: 1) D50 is too small, the amount of the active ion-intercalatable sites is relatively low, that means, the negative electrode active material has lower capacity per gram and the battery has lower energy density; 2) the degree of graphitization G is too small, the crystals tend to have amorphous structure with many defects, and the negative electrode active material has lower capacity per gram, which is disadvantageous for designing a battery with high energy density. Therefore, under comprehensive consideration, B has a range of $5.3 \leq B \leq 14.5$, more preferably $6.5 \leq B \leq 12$, in which case the cycle performance, energy density, fast charge performance are excellent.

In the disclosure, the ratio of A/B is defined as a battery equilibrium constant K. The inventors have further found that, the overall performance of the battery can be further improved when battery equilibrium constant K is in the range of from 0.055 to 0.31.

When A is too small or B is too large so that the battery equilibrium constant K<0.055, the charging speed is sacrificed to obtain a battery with high energy density, resulting in high risk of reduction and plating (deposition) of active ions at negative electrode, thus the battery has a great safety hazard and the cycle performance of the battery cannot be guaranteed.

When A is too large or B is too small so that the battery equilibrium constant K>0.31, the energy density is sacrificed to obtain a battery with high charging speed, which will cause troubles in actual use due to the relatively short cruising range of the battery. Therefore, under comprehensive consideration, K fulfills the condition of $0.055 \leq K \leq 0.31$, preferably $0.112 \leq K \leq 0.26$.

As used herein, in the context related to the negative electrode active material, the parameters including average particle diameter D50, the degree of graphitization G and the orientation index $V_{OI}$ of the negative electrode layer have the common meanings well known in the art.

D50 is used for characterizing the particle size of the negative electrode active material. It physically means the particle diameter which corresponds to 50% of the volume distribution of the negative electrode active material particles, i.e., the volume distribution average particle diameter. D50 can be determined by methods well known in the art, such as the methods described in the Examples section herein.

The degree of graphitization G indicates the degree to which the structure of the negative electrode active material is close to the complete layered structure of the ideal graphite. The degree of graphitization G of the negative electrode active material can be determined by methods well known in the art, such as the methods described in the Examples section herein.

The orientation index OI value (i.e. $V_{OI}$) of the negative electrode layer represents the degree of anisotropy of crystal grain alignment in the negative electrode layer. The OI value of the negative electrode layer can be determined by methods well known in the art, such as the methods described in the Examples section herein.

The negative electrode plate in the present disclosure can be prepared by methods well known in the art. Typically, the negative electrode active material is mixed with materials such as optional conductive agent (such as carbon materials, like carbon black), binder (such as SBR), thickening and dispersing agent (such as CMC) and other optional additives (such as PTC thermistor material), and then dispersed in solvent (such as deionized water). Upon uniformly stirring, the mixture is coated on at least one surface of the negative electrode current collector. After drying, a negative electrode plate containing the negative electrode layer is obtained. Typically, in the preparation of the negative electrode plate, a negative electrode coating layer is not formed on a part of current collector, and a part of the remaining current collector is used as the leading wire portion of the negative electrode. Certainly, the leading wire portion may also be added later.

As the negative electrode current collector, a material for example a metal foil, such as copper foil, or a porous metal plate can be used. Copper foil having a thickness of 5 to 30 µm is commonly used. The thickness of the single-layer negative electrode layer on the negative electrode current collector is usually from 5 µm to 80 µm.

It should be noted that the OI value of the negative electrode layer in the present disclosure can be controlled by adjusting the following parameters.

First, both the average particle diameter D50 of the negative electrode active material and the OI value $G_{OI}$ of the active material powder have a certain influence on the CH value of the negative electrode layer; the higher the D50 of the negative electrode active material, the higher the OI value of the negative electrode layer, the higher the powder OI value of the negative electrode active material, the OI value of the negative electrode layer.

Second, in the preparation of a battery, the magnetic field inducing technology can be introduced in the coating process to artificially induce the arrangement of the negative electrode active material on the electrode plate, thereby changing the OI value of the negative electrode layer. The arrangement of the negative electrode active material may also be controlled by adjusting the press density of the negative electrode layer in the cold pressing step, thereby controlling the OI value of the negative electrode layer.

Preferably, the OI value $V_{OI}$ of the negative electrode layer is 1.5-100, further preferably 1.5-50.

Preferably, the press density of the negative electrode layer is in the range of 0.8-2.0 g/cm$^3$, further preferably 1.0-1.6 g/cm$^3$.

Preferably, the average particle diameter D50 of the negative electrode active material is 3-25 µm, further preferably 4-15 µm.

Preferably, the powder OI value $G_{OI}$ of the negative electrode active material is 0.5-7, more preferably 2-4.5.

The negative electrode active material used for the negative electrode plate according to the disclosure comprises graphite material. The graphite material may be selected from at least one of artificial graphite and natural graphite.

In one embodiment, in addition to graphite material, the negative electrode active material may also comprise one or more of soft carbon, hard carbon, carbon fiber, mesocarbon microbead, silicon-based material, tin-based material, lithium titanate.

The silicon-based material may be selected from one or more of elemental silicon, silicon oxide, silicon carbon composite, silicon alloy. The tin-based material may be selected from one or more of elemental tin, tin oxide compound, tin alloy Furthermore, in an embodiment wherein the negative electrode active material is a mixture, the graphite material generally constitutes higher than 50%, preferably higher than 60%, 65%, 70%, 75%, 80%, 85%, 90%, or 95% by weight of the negative electrode active material.

The negative electrode active materials suitable for use in the disclosure are commonly used materials for secondary battery known in the art, and are commercially available. The graphite material under different types supplied by different manufacturers may have varying average particle diameter D50 and the degree of graphitization G. Or, the negative electrode active material having the specific D50 and the degree of graphitization G as defined by the disclosure may also be produced by a conventional process for the preparation of negative electrode active material in the art (such as, the methods in the Examples section). The present disclosure focuses on selecting a specific graphite material (and other negative electrode active materials), and controlling the OI value of the negative electrode layer, so that the parameters (for example, the average particle diameter D50 or the degree of graphitization G, etc.) of the negative electrode active material and the negative electrode layer are reasonably matched with the OI value of the negative electrode layer, thereby achieving the technical effects of the disclosure. Preferably, the degree of graphitization G of graphite material used in the disclosure is 40%-99%, further preferably 80%-98%.

In another aspect, the present disclosure provides a secondary battery, comprising the negative electrode plate according to the first aspect of the disclosure.

Except use of the negative electrode plate of the disclosure, the construction and the preparation method of the secondary battery of the disclosure are well known. Generally, a secondary battery is mainly composed of a negative electrode, a positive electrode, a separator, and an electrolyte, wherein the positive and negative electrodes are immersed in the electrolyte, and the active ions in the electrolyte as a medium are moved between the positive and negative electrodes to realize charging and discharging of the battery. In order to avoid short circuit between the positive and negative electrodes through the electrolyte, it is necessary to separate the positive and negative electrodes with a separator. The shape of the secondary battery may be, for example, a cylindrical shape (square cylinder or cylindrical shape), wherein the secondary battery may have an aluminum shell as a casing, or may be a soft package battery.

It should be noted that the battery according to another aspect of the present application may be a lithium ion battery, a sodium ion battery, and any other battery using the negative electrode plate of the first aspect of the present disclosure.

Specifically, when the battery is a lithium ion battery:

The positive electrode plate comprises a positive electrode current collector and a positive electrode layer disposed on the surface of the positive electrode current collector, wherein the positive electrode layer comprises a positive electrode active material, and the positive electrode active material may be selected from the group of lithium cobalt oxide, lithium nickel oxide, lithium manganese oxide, and lithium nickel manganese oxide, lithium nickel cobalt manganese oxide, lithium nickel cobalt aluminum oxide, transition metal phosphate, etc. However, the present application is not limited to these materials, and other conventionally known materials that can be used as a positive electrode active material of a lithium ion battery may also be used. These positive electrode active materials may be used alone or in combination of two or more.

Specifically, when the battery is a sodium ion battery:

The positive electrode plate comprises a positive electrode current collector and a positive electrode layer disposed on the surface of the positive electrode current collector, wherein the positive electrode layer comprises a positive electrode active material, and the positive electrode active material may be selected from the group of sodium iron composite oxide ($NaFeO_2$), sodium cobalt composite oxide ($NaCoO_2$), sodium chromium composite oxide ($NaCrO_2$), sodium manganese composite oxide ($NaMnO_2$), sodium nickel composite oxide ($NaNiO_2$), sodium nickel titanium composite oxide ($NaNi_{1/2}Ti_{1/2}O_2$), sodium nickel manganese composite oxide ($NaNi_{1/2}Mn_{1/2}O_2$), sodium iron manganese composite oxide ($Na_{2/3}Fe_{1/3}Mn_{2/3}O_2$), sodium nickel cobalt manganese composite oxide ($NaNi_{1/3}Co_{1/3}Mn_{1/3}O_2$), sodium iron phosphate compound ($NaFePO_4$), sodium manganese phosphate compound ($NaMnPO_4$), sodium cobalt phosphate compound ($NaCoPO_4$), Prussian blue materials, polyanionic materials (phosphate, fluorophosphate, pyrophosphate, sulfate) and the like. However, the present application is not limited to these materials, and other conventionally known materials that can be used as a positive electrode active material of a sodium ion battery may also be used. These positive electrode active materials may be used alone or in combination of two or more.

In the battery of another aspect of the disclosure, the particular types and the constitution of the separator and the electrolyte are not specifically limited, and may be selected depending on the actual needs.

Specifically, the separator may be selected from the group consisting of a polyethylene layer, a polypropylene layer, a polyvinylidene fluoride layer, and a multilayer composite layer thereof.

Specifically, when the battery is a lithium ion battery, as nonaqueous electrolyte, a lithium salt solution dissolved in an organic solvent is generally used. Lithium salt is an inorganic lithium salt, such as $LiClO_4$, $LiPF_6$, $LiBF_4$, $LiAsF_6$, $LiSbF_6$ and the like, or organic lithium salt, such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3(n\geq2)$. The organic solvent used in nonaqueous electrolyte is a cyclic carbonate, such as ethylene carbonate, propylene carbonate, butylene carbonate or vinylene carbonate and the like; a chain-like carbonate, such as dimethyl carbonate, diethyl carbonate or methyl ethyl carbonate and the like; a chain-like ester such as methyl propionate and the like; cyclic ester such as γ-butyrolactone and the like; a chain-like ether, such as dimethoxyethane, diethyl ether, diethylene glycol dimethyl ether, and triethylene glycol dimethyl ether and the like; a cyclic ether, such as tetrahydrofuran, 2-methyltetrahydrofuran and the like; a nitrile, such as acetonitrile, propionitrile and the like; or a mixture of these solvents.

Hereinafter, a lithium ion secondary battery will be used as an example for briefly illustrating the structure and preparation method of the secondary battery of the present disclosure.

First, a battery positive electrode plate is prepared in accordance with a conventional method in the art. The positive electrode active material used for the positive electrode plate is not limited in the present disclosure. Usually, in the above positive electrode active material, it is necessary to add a conductive agent (for example, carbon materials, like carbon black), a binder (for example, PVDF), or the like. If needed, other additives such as PTC thermistor materials and the like may also be added. These materials are usually mixed and dispersed in a solvent (for example, NMP), and after uniformly stirring, the mixture is uniformly coated on a positive electrode current collector, and dried to obtain a positive electrode plate. As the positive electrode current collector, a material for example a metal foil, such as aluminum foil, or a porous metal plate can be used. Aluminum foil having a thickness of 8 to 30 μm is commonly used. The thickness of coating (layer) on the positive electrode current collector is usually from 5 μm to 60 μm. Typically, in the preparation of the positive electrode plate, a positive electrode coating layer is not formed on a part of current collector, and a part of the remaining current collector is used as the leading wire portion of the positive electrode. Certainly, the leading wire portion may also be added later.

Then, the negative electrode plate of the present disclosure is prepared as described above.

Finally, the positive electrode plate, the separator, the negative electrode plate are stacked in order, so that the separator is positioned between the positive and the negative electrode plates for the purpose of separation, then wound to obtain a bare battery cell. The bare battery cell is placed in the outside casing, and dried. Then the electrolyte is injected. After vacuum encapsulation, standing, formation, shaping, and the like, a secondary battery is obtained.

The present disclosure can allow a secondary battery having an excellent fast charge capability as compared with the conventional negative electrode plate. Through further optimization, the energy density, cycle performance, and safety performance of the battery can be simultaneously considered and improved. Therefore, it is of great significance for the fields of such as new energy vehicles.

Advantageous effects of the present invention will be further described below in conjunction with the examples.

EXAMPLES

In order to make the objects, the technical solutions and the beneficial technical effects of the present disclosure more clear, the present disclosure will be further described in details with reference to the examples below. However, it is to be understood that the examples of the present disclosure are not intended to limit the invention, and the embodiments of the disclosure are not limited to the examples set forth herein. The specific experimental conditions or operating conditions are not specified in the examples, and the examples are usually prepared according to the conditions recommended by the material supplier.

I. Preparation Method of the Negative Electrode Active Material

The graphites having different D50 and G used in Examples 1-49 and Comparative Examples 1-6 are commercially available or can be prepared by the following production methods.

(1) Crushing: crushing the precursor (for example pitch coke or petroleum coke is selected as needed) to obtain a raw material having an average particle diameter of 5-20 μm;

(2) Shaping and grading: shaping the raw material obtained in (1), followed by performing a grading treatment to adjust the particle size distribution of the raw material (generally, removing particles having an excessively large particle size and particles having an excessively small particle size);

(3) Granulating: mixing the raw materials and the binder obtained after the shaping and sieving in (2) in a certain mass ratio, followed by granulating (this step can be canceled according to actual situation);

(4) Granulating: graphitizing the raw material after the granulation in (3), for example, in an Acheson graphitization furnace at a temperature of such as 2800-3250° C.;

(5) Coating and carbonizing: the raw material after the graphitization in (4) are mixed with a coating agent at a certain mass ratio and then carbonized, for example, in an orbital kiln at a temperature of such as 900 to 1500° C. (this step can be cancelled according to the actual situation);

(6) Sieving and demagnetizing: sieving and demagnetizing the material obtained in (5) to obtain a desired negative material.

The average particle diameter D50 of the active material can be adjusted by crushing, shaping and grading, granulating, coating and carbonizing steps. The degree of graphitization G of the negative electrode active material can be adjusted by graphitizing, coating and carbonizing steps.

II. Preparation Method of the Testing Battery

The batteries of Examples 1-49 and Comparative Examples 1-6 were prepared by the following methods.

A) Preparation Method of the Positive Electrode Plate:

The positive electrode active material NCM523 ($LiNi_{0.5}Co_{0.2}Mn_{0.3}O_2$), a conductive agent (Super P), a binder (PVDF), etc. were mixed at a ratio of 96:2:2. After addition of a solvent (NMP), the mixture was stirred under a vacuum stirrer until the system was uniformly transparent, yielding a positive electrode slurry. The positive electrode slurry was uniformly coated on the aluminum foil of the positive electrode current collector. The positive electrode current collector coated with the positive electrode slurry was air-dried at room temperature, transferred to an oven for drying, and then subjected to cold pressing and slitting to obtain a positive electrode plate.

B) Preparation Method of the Negative Electrode Plate:

The negative electrode active material (graphite or mixed material containing graphite), a conductive agent (Super P), a thickening agent (carboxymethyl cellulose), a binder (SBR), etc. were mixed at a ratio of 96.4:1:1.2:1.4. The mixture was uniformly mixed with solvent (deionized water) under a vacuum stirrer to prepare a negative electrode slurry.

The negative electrode slurry was uniformly coated on the copper foil of the negative electrode current collector. The negative electrode current collector coated with the negative electrode slurry was air-dried at room temperature, transferred to an oven for drying, and then subjected to cold pressing and slitting to obtain a negative electrode plate.

C) Preparation Method of Electrolyte:

Ethylene carbonate (EC), ethyl methyl carbonate (EMC), and diethyl carbonate (DEC) were mixed at a volume ratio of 1:1:1. Then the sufficiently dried lithium salt $LiPF_6$ was dissolved at a ratio of 1 mol/L in a mixed organic solvent, to prepare an electrolyte solution.

D) The Preparation Method of Separator:

A 12 micron polyethylene layer was chosen.

E) Assembly of the Battery:

The positive electrode plate, the separator and the negative electrode plate were stacked in order, so that the separator is positioned between the positive and negative electrode plates for the purpose of separation, and then wound to obtain a bare battery cell. The bare battery cell was placed in the outer casing. The prepared electrolyte solution was injected into the dried bare battery cell. After vacuum encapsulation, standing, formation, shaping, and the like, a lithium ion secondary battery is obtained.

III. Testing Methods of Performance Parameters

The performance parameters involved in Examples 1-49 and Comparative Examples 1-6 were measured in the following methods.

1, Testing the Parameters of Negative Electrode Active Material

1) D50: The particle size distribution was measured using a laser diffraction particle size distribution measuring instrument (Mastersizer 3000) according to the laser diffraction method for measuring particle size distribution in GB/T19077-2016. For the volume distribution, the median value D50 was used to represent the average particle diameter.

2) G: By using X-ray powder diffractometer (X'pert PRO) according to the X-ray diffraction analysis method and the lattice parameter determination method of graphite JIS K 0131-1996, JB/T4220-2011, $d_{002}$ was measured. Then, the degree of graphitization G was calculated according to the formula $G=(0.344-d_{002})/(0.344-0.3354)$, where $d_{002}$ is the layer spacing in the crystal structure of the negative electrode active material expressed in nanometer.

2, Testing the Parameters of the Negative Electrode Plate

Testing the OI value $V_{OI}$ of the negative electrode layer: By using an X-ray powder diffractometer (X'pert PRO) according to the X-ray diffraction analysis method and the lattice parameter determination method of graphite JIS K 0131-1996, JB/T4220-2011, X-ray diffraction spectrum was obtained. Then, the OI value of the negative electrode layer can be calculated according to $V_{OI}=C_{004}/C_{110}$, wherein $C_{004}$ was the peak area of the 004 characteristic diffraction peak, and $C_{110}$ is the peak area of the 110 characteristic diffraction peak.

3, Testing the Performance of the Battery

1) Testing Energy Density

The lithium ion batteries prepared in Examples and Comparative Examples were fully charged at a 1 C rate and fully charged at a 1 C rate at 25° C., and the actual discharge energy was recorded. The lithium ion batteries were weighed using an electronic balance at 25° C. The ratio of the actual discharge energy of a lithium ion battery 1 C to the weight of a lithium ion battery was the actual energy density of the lithium ion battery.

Wherein: when the actual energy density was less than 80% of the target energy density, the actual energy density of the battery was considered to be very low; when the actual energy density was greater than or equal to 80% of the target energy density and less than 95% of the target energy density, the actual energy density of the battery was considered to be low; when the actual energy density was greater than or equal to 95% of the target energy density and less than 105% of the target energy density, the actual energy density of the battery was considered to be moderate; when the actual energy density was greater than or equal to 105% of the target energy density and less than 120% of the target energy density, the actual energy density of the battery was considered to be high; when the actual energy density was 120% or more of the target energy density, the actual energy density of the battery was considered to be very high.

2) Kinetic Performance (Fast Charge Performance)

The lithium ion batteries prepared in Examples and Comparative Examples were fully charged at a 4 C rate and fully discharged at a 1 C rate at 25° C. This procedure was repeated ten times. Then the lithium ion batteries were fully charged at a 4 C rate, followed by disassembling the negative electrode plate and visually inspecting the lithium precipitated on the negative electrode plate. The area of the lithium precipitated area of less than 5% was considered to be slight lithium precipitation. The area of the lithium precipitated area of 5% to 40% was considered to be moderate lithium precipitation. The area of the lithium precipitated area of greater than 40% was considered to be serious lithium precipitation.

3) Testing Cycle Performance:

At 25° C., the lithium ion batteries prepared in Examples and Comparative Examples were charged at a 3 C rate, discharged at a 1 C rate, until the capacity of the lithium ion batteries were attenuated to 80% of the initial capacity. The cycle times were recorded.

IV. The Testing Results of Examples and Comparative Examples

The batteries of Examples 1-49 and Comparative Examples 1-6 were prepared according to the above methods. The performance parameters were measured. The results were shown as below.

| Items | Negative electrode material | Particle diameter D50(μm) | Degree of graphitization G | OI value $V_{OI}$ of layer | Kinetic parameter A | Energy density B | Equilibrium constant K | Processing performance | Actual energy density | Kinetic performance | Cycle life (cycle) |
|---|---|---|---|---|---|---|---|---|---|---|---|
| Example 1 | graphite | 19 | 90.00% | 5 | 1.85 | 14.58 | 0.127 | Good | Very high | No lithium precipitation | 3450 |
| Example 2 | graphite | 19 | 90.00% | 9 | 0.86 | 14.58 | 0.059 | Good | Very high | No lithium precipitation | 3380 |
| Example 3 | graphite | 19 | 90.00% | 10 | 0.77 | 14.58 | 0.053 | Good | Very high | No lithium precipitation | 3140 |
| Example 4 | graphite | 19 | 90.00% | 20 | 0.50 | 14.58 | 0.034 | Good | Very high | Slight lithium precipitation | 2300 |
| Example 5 | graphite | 19 | 90.00% | 25 | 0.47 | 14.58 | 0.032 | Good | Very high | Slight lithium precipitation | 2120 |
| Example 6 | graphite | 19 | 90.00% | 30 | 0.45 | 14.58 | 0.031 | Good | Very high | Moderate lithium precipitation | 1800 |
| Example 7 | graphite | 15 | 90.00% | 120 | 0.52 | 12.08 | 0.043 | Good | High | Slight lithium precipitation | 2070 |
| Example 8 | graphite | 15 | 90.00% | 40 | 0.54 | 12.08 | 0.045 | Good | High | Slight lithium precipitation | 2160 |
| Example 9 | graphite | 15 | 90.00% | 11.5 | 0.74 | 12.08 | 0.061 | Good | High | Slight lithium precipitation | 2370 |
| Example 10 | graphite | 15 | 90.00% | 11 | 0.76 | 12.08 | 0.063 | Good | High | No lithium precipitation | 3120 |
| Example 11 | graphite | 15 | 90.00% | 6 | 1.31 | 12.08 | 0.109 | Good | High | No lithium precipitation | 3460 |
| Example 12 | graphite | 15 | 90.00% | 3.5 | 2.85 | 12.08 | 0.236 | Good | High | Slight lithium precipitation | 2410 |
| Example 13 | graphite | 4 | 90.00% | 2.6 | 3.07 | 5.20 | 0.591 | Good | Very low | Slight lithium precipitation | 2370 |
| Example 14 | graphite | 4 | 90.00% | 4.5 | 2.33 | 5.20 | 0.447 | Good | Very low | Slight lithium precipitation | 2500 |
| Example 15 | graphite | 4 | 90.00% | 10 | 2.03 | 5.20 | 0.390 | Good | Very low | No lithium precipitation | 3420 |
| Example 16 | graphite | 4 | 90.00% | 20 | 1.97 | 5.20 | 0.379 | Good | Very low | No lithium precipitation | 3220 |
| Example 17 | graphite | 4 | 90.00% | 50 | 1.95 | 5.20 | 0.376 | Good | Very low | No lithium precipitation | 3100 |
| Example 18 | graphite | 4 | 90.00% | 80 | 1.95 | 5.20 | 0.375 | Good | Very low | No lithium precipitation | 2980 |
| Example 19 | graphite | 2.6 | 90.00% | 15 | 3.02 | 4.33 | 0.699 | Slightly falling off powders | Very low | Slight lithium precipitation | 2060 |

-continued

| Items | Negative electrode material | Particle diameter D50(μm) | Degree of graphitization G | OI value $V_{OI}$ of layer | Kinetic parameter A | Energy density B | Equilibrium constant K | Processing performance | Actual energy density | Kinetic performance | Cycle life (cycle) |
|---|---|---|---|---|---|---|---|---|---|---|---|
| Example 20 | graphite | 3 | 90.00% | 15 | 2.63 | 4.58 | 0.574 | Slight falling off powders | Very low | Slight lithium precipitation | 2170 |
| Example 21 | graphite | 5 | 90.00% | 15 | 1.60 | 5.83 | 0.275 | Good | Low | No lithium precipitation | 3600 |
| Example 22 | graphite | 10 | 90.00% | 15 | 0.86 | 8.95 | 0.097 | Good | Moderate | No lithium precipitation | 3440 |
| Example 23 | graphite | 18 | 90.00% | 15 | 0.59 | 13.95 | 0.042 | Good | High | Slight lithium precipitation | 2420 |
| Example 24 | graphite | 25 | 90.00% | 15 | 0.52 | 18.33 | 0.029 | Slight bumping | Very high | Slight lithium precipitation | 2250 |
| Example 25 | graphite | 27 | 90.00% | 15 | 0.52 | 19.58 | 0.026 | Serious bumping | Very high | Slight lithium precipitation | 2040 |
| Example 26 | graphite | 19 | 70.00% | 20 | 0.50 | 13.98 | 0.036 | Good | High | Slight lithium precipitation | 2200 |
| Example 27 | graphite | 19 | 80.00% | 20 | 0.50 | 14.28 | 0.035 | Good | High | Slight lithium precipitation | 2510 |
| Example 28 | graphite | 19 | 85.00% | 20 | 0.50 | 14.43 | 0.035 | Good | High | Slight lithium precipitation | 2380 |
| Example 29 | graphite | 19 | 95.00% | 20 | 0.50 | 14.73 | 0.034 | Good | Very high | Slight lithium precipitation | 2260 |
| Example 30 | graphite | 19 | 99.00% | 20 | 0.50 | 14.85 | 0.034 | Good | Very high | Slight lithium precipitation | 2060 |
| Example 31 | graphite | 15 | 70.00% | 20 | 0.59 | 11.48 | 0.052 | Good | Moderate | Slight lithium precipitation | 2260 |
| Example 32 | graphite | 15 | 80.00% | 20 | 0.59 | 11.78 | 0.050 | Good | Moderate | Slight lithium precipitation | 2560 |
| Example 33 | graphite | 15 | 85.00% | 20 | 0.59 | 11.93 | 0.050 | Good | Moderate | Slight lithium precipitation | 2400 |
| Example 34 | graphite | 15 | 95.00% | 20 | 0.59 | 12.23 | 0.048 | Good | High | Slight lithium precipitation | 2310 |
| Example 35 | graphite | 15 | 99.00% | 20 | 0.59 | 12.35 | 0.048 | Good | High | Slight lithium precipitation | 2170 |
| Example 36 | graphite | 4 | 70.00% | 20 | 1.97 | 4.60 | 0.428 | Good | Very low | No lithium precipitation | 3110 |
| Example 37 | graphite | 4 | 80.00% | 20 | 1.97 | 4.90 | 0.402 | Good | Very low | No lithium precipitation | 3250 |
| Example 38 | graphite | 4 | 85.00% | 20 | 1.97 | 5.05 | 0.390 | Good | Very low | No lithium precipitation | 3300 |
| Example 39 | graphite | 4 | 95.00% | 20 | 1.97 | 5.35 | 0.368 | Good | Low | No lithium precipitation | 3180 |
| Example 40 | graphite | 4 | 99.00% | 20 | 1.97 | 5.47 | 0.360 | Good | Low | No lithium precipitation | 3060 |
| Example 41 | graphite | 5.7 | 96.00% | 5.5 | 1.73 | 6.44 | 0.268 | Good | Low | No lithium precipitation | 3320 |
| Example 42 | graphite | 6.2 | 90.00% | 4 | 1.99 | 6.58 | 0.303 | Good | Moderate | No lithium precipitation | 3180 |
| Example 43 | graphite | 14 | 90.00% | 6 | 1.30 | 11.45 | 0.113 | Good | Moderate | No lithium precipitation | 3610 |
| Example 44 | graphite | 15 | 80.00% | 6 | 1.31 | 11.78 | 0.111 | Good | Moderate | No lithium precipitation | 3570 |
| Example 45 | graphite | 5 | 93.00% | 5 | 1.94 | 5.92 | 0.328 | Good | Low | No lithium precipitation | 2980 |
| Example 46 | graphite | 7 | 70.00% | 4 | 1.95 | 6.48 | 0.300 | Good | Low | No lithium precipitation | 3050 |
| Example 47 | graphite + soft carbon (7:3) | 7 | 90.00% | 12 | 1.21 | 7.08 | 0.171 | Good | Moderate | No lithium precipitation | 4100 |

-continued

| Items | Negative electrode material | Particle diameter D50(μm) | Degree of graphitization G | OI value $V_{OI}$ of layer | Kinetic parameter A | Energy density B | Equilibrium constant K | Processing performance | Actual energy density | Kinetic performance | Cycle life (cycle) |
|---|---|---|---|---|---|---|---|---|---|---|---|
| Example 48 | graphite + hard carbon (7:3) | 6.5 | 88.00% | 10 | 1.32 | 6.70 | 0.197 | Good | Moderate | No lithium precipitation | 4500 |
| Example 49 | graphite + lithium titanate (7:3) | 7 | 91.00% | 14 | 1.18 | 7.11 | 0.166 | Good | Moderate | No lithium precipitation | 5300 |
| Comparative Example 1 | graphite | 30 | 90.00% | 40 | 0.30 | 21.45 | 0.014 | Serious bumping | Very high | Serious lithium precipitation | 170 |
| Comparative Example 2 | graphite | 2.3 | 90.00% | 40 | 3.39 | 4.138 | 0.820 | Serious falling off powders | Very low | Serious lithium precipitation | 210 |
| Comparative Example 3 | graphite | 19 | 90.00% | 40 | 0.43 | 14.58 | 0.030 | Good | Very high | Serious lithium precipitation | 260 |
| Comparative Example 4 | graphite | 19 | 90.00% | 3.5 | 3.36 | 14.58 | 0.230 | Good | Very high | Serious lithium precipitation | 450 |
| Comparative Example 5 | graphite | 15 | 90.00% | 3.2 | 3.30 | 12.08 | 0.274 | Good | High | Serious lithium precipitation | 280 |
| Comparative Example 6 | graphite | 4 | 90.00% | 2.5 | 3.17 | 5.20 | 0.609 | Good | Very low | Serious lithium precipitation | 360 |

First, as can be seen from the data of Examples 1-49 and Comparative Examples 1-6: In order to obtain the battery having a good fast charge performance (i.e. no serious lithium precipitation in the fast charge test) while maintaining the necessary cycle performance (i.e. the number of cycles is at least greater than 1500 times), the kinetic parameter $A=7.8/D50+1.9 \times D50/(V_{OI})^2$ must be kept in the range of $0.45 \leq A \leq 3.1$. Specifically, as shown in Comparative Examples 1 and 3, when $A<0.45$, serious lithium precipitation occurs in the batteries, resulting in a dramatic capacity fade ("diving phenomenon") of cycle; Similarly, when $A>3.1$, such as in Comparative Examples 2, 4, 5, and 6, serious lithium precipitation occurs in the batteries, resulting in a dramatic capacity fade ("diving phenomenon") of cycle. In contrast, when A is in the range of $0.45 \leq A \leq 3.1$, the batteries have good fast charge performance and cycle performance. Even if in the critical region close to the boundary of the range (for example, $A=0.47$ in Example 5, $A=0.45$ in Example 6, and $A=3.02$ in Example 19), only a moderate lithium precipitation is shown in the worst case in the battery fast charge test, meanwhile the number of cycles is not less than 1800. When the kinetic parameter A fulfills the condition $0.75 \leq A \leq 2.0$, no lithium precipitation occurs during fast charging and the batteries have a the number of cycles of higher than 3000 times and excellent performance. Therefore, the preferred range of A is $0.75 \leq A \leq 2.0$.

In addition, in Examples 1-6, 7-12, and 13-18, the influence of varying OI values of the negative electrode layers on the battery performance were examined under the conditions with the fixed values of particle diameters D50 of negative electrode active material and the degree of graphitization G. It can be seen from these Examples that: with different particle diameters D50, the influences of the OI values of the negative electrode layers on the battery performance are not the same, and the relationship between the $V_{OI}$ value and the fast charge performance of the battery is also not a simple linear relationship. When an electrode plate is designed, it is important to match the $V_{OI}$ value of the negative electrode layer with the particle diameter D50 of the negative electrode material. When the $V_{OI}$ value and the D50 value are well matched so that the kinetic parameter A falls within a preferred range of $0.75 \leq A \leq 2.0$, no lithium precipitation occurs and the battery has an excellent cycle performance. When the $V_{OI}$ value and the D50 value are not matched and A falls outside the above preferred range, slight lithium precipitation may occur in the battery.

Furthermore, it can be found by the comparison of Examples 1-18 that the energy density parameter $B=D50 \times 0.625+G \times 3$ is closely related to the actual energy density performance of a battery. In order to maintain a high energy density, the parameter B should not be lower than 5.3. In Example 13-18, the D50 is too small and the resulting B is lower than 5.3, in which case the battery has relatively good fast charge performance and cycle performance, however, the energy density is very low.

In Examples 19-25, the influences of different graphites as the negative electrode active material on the battery performance with the same degree of graphitization G were compared, under the conditions with the same OI value of layer. In these examples, all of the A values fall within the range of $0.45 \leq A \leq 3.1$, the batteries have relatively good fast charge performance and cycle performance, and no lithium precipitation or slight lithium precipitation occurs during fast charging, and all of the numbers of cycle are greater than 2000 times. Especially, when the kinetic parameter A fulfills the condition of $0.75 \leq A \leq 2.0$ (in Examples 21 and 22), the batteries have excellent performance and no lithium precipitation occurs during fast charging, and all of the numbers of cycle are greater than 3000 time. In addition, it can be seen that as D50 increases, the energy density parameter $B=D50 \times 0.625+G \times 3$ also increases, and accordingly the actual energy density of the battery also increases. When D50 is too small, the active ion-intercalatable sites are less, that is, the negative electrode active material has a lower capacity per gram and a lower battery energy density, and the bad adhesion of too small particles causes the fall-off phenomenon of powders. From the experimental results, the energy density parameter B should not be less than 5.3. However, when the D50 is too large, even if the energy density of the battery is high, the slurry tends to settle, and bumps are likely to occur during coating with low yield, which in turn leads to poor cycle performance. Under comprehensive consideration, the energy density parameter B is preferably not greater than 14.5, more preferably not greater than 12.

In Examples 26-40 the influences of the degrees of graphitization G on battery performance under the conditions with varying D50 values (19, 15, 4 μm) were compared, by adjusting the process to maintain a fixed OI value of the negative electrode layer. In these examples, all of the A values are in the range of 0.45≤A≤3.1, the batteries have relatively good fast charge performance and cycle performance, and no lithium precipitation or slight lithium precipitation occurs during fast charging, and all of the numbers of cycle are greater than 2000 times. Especially, when the kinetic parameter A fulfills the condition of 0.75≤A≤2.0 (Examples 36-40), the batteries have excellent performance without lithium precipitation during fast charging and all of the numbers of cycle are greater than 3000 times. In addition, it can be seen that as the value of the degree of graphitization G increases, the energy density parameter B=D50×0.625+G×3 also increases, and accordingly the actual energy density of the battery also increases. When the degree of graphitization G is too large, the particles tend to be flat, and the structure of pores is too dense, which is not conducive to the infiltration of electrolyte and causes worse cycle performance of battery. In contrast, when the degree of graphitization G is too small, the crystals tend to have amorphous structure with many defects, and the negative electrode active material has lower capacity per gram, which is disadvantageous for designing a battery with high energy density. Therefore, D50 and G should be comprehensively considered, so that B has a range of 5.3≤B≤14.5, and preferably 6.5≤B≤12. For example, in Examples 36-38 where both D50 and G are small and B<5.3, the batteries have very low actual energy density; while in Examples 29 and 30 where B>14.5, the cycle performance is relatively poor.

In Examples 41-46, the influences of the energy density parameter B and the equilibrium constant K=A/B on the battery performance were discussed. In these examples, all of the A values fall within the most preferred range of 0.75≤A≤2.0, thus the batteries have excellent fast charge performance and cycle performance with no lithium precipitation, and the numbers of cycle are greater than 2900 times. It can be seen from the experimental data that, the value of the energy density parameter B directly affects the actual energy density of the battery. In these examples, all of the B values fall within the range of 5.3≤B≤14.5, and the energy densities of the batteries are finally at an acceptable level. However, when B is lower than 6.5 (Examples 41, 45, and 46), the batteries have relative low energy density. Under comprehensive consideration with the range of B values in other Examples, the most preferred range of B is 6.5≤B≤12.

In addition, Examples 41-46 further illustrate the influence of the equilibrium constant K=A/B on the battery performance. It can be seen from the test data that when 0.055≤K≤0.31 (Examples 41-44), the batteries have relative good fast charge performance, cycle performance, and energy density. Especially when 0.112≤K≤0.26 (Examples 43), the batteries have best performance.

Examples 1-46 show the examples in which graphite material is used as the negative electrode active material to illustrate the technical solutions and effects of the present disclosure. Examples 47-49 show another embodiment of the present disclosure in which a mixed material comprising a graphite material is used as the negative electrode active material. In Examples 47-49 where graphite material and other commonly used negative electrode active materials (soft carbon, hard carbon, lithium titanate) were mixed as negative electrode active material while maintaining the kinetic parameter A in the most preferred range of 0.75≤A≤2.0, and the energy density parameter B in the most preferred range of 6.5≤B≤12, and the equilibrium constant K in the most preferred range of 0.112≤K≤0.26, the results show that the batteries in the respective examples have very excellent processing performance, cycle performance (greater than 4000 time), fast charge performance (no lithium precipitation) and energy density. This indicates, the parameters A, B, and K as defined in the disclosure are also applicable to the mixed negative electrode active material comprising graphite material.

It is also to be understood that the above-described embodiments may be appropriately modified and varied by those skilled in the art in light of the above disclosure. Therefore, the present invention is not limited to the specific embodiments as disclosed and described above, and the modifications and variations of the disclosure are intended to fall within the scope of the appended claims. In addition, although some specifically defined terms are used in the specification, these terms are merely used for convenience of description and do not impose any limitation on the present invention.

The invention claimed is:

1. A negative electrode plate, comprising a negative electrode current collector and a negative electrode layer coated on at least one surface of the negative electrode current collector, the negative electrode layer comprising a negative electrode active material, wherein the negative electrode active material comprises a graphite material, and the negative electrode layer fulfills the condition:

$$0.45 \leq 7.8/D50 + 1.9 \times D50/(V_{OI})^2 \leq 3.1 \quad \text{formula I)}$$

wherein
D50 represents a volume distribution average particle diameter of particles of the negative electrode active material in micron,
$V_{OI}$ represents the OI value of the negative electrode layer.

2. The negative electrode plate according to claim 1, wherein the negative electrode layer fulfills the condition:

$$0.75 \leq 7.8/D50 + 1.9 \times D50/(V_{OI})^2 \leq 2.0 \quad \text{formula II).}$$

3. The negative electrode plate according to claim 1, wherein the negative electrode active material fulfills the condition:

$$5.3 \leq D50 \times 0.625 + G \times 3 \leq 14.5 \quad \text{formula III)}$$

wherein D50 represents a volume distribution average particle diameter of particles of the negative electrode active material in micron,
G represents the degree of graphitization of the negative electrode active material.

4. The negative electrode plate according to claim 3, wherein the negative electrode active material fulfills the condition:

$$6.5 \leq D50 \times 0.625 + G \times 3 \leq 12 \quad \text{formula IV).}$$

5. The negative electrode plate according to claim 1, wherein the negative electrode layer fulfills the condition:

$$0.055 \leq A/B \leq 0.31 \quad \text{formula V)}$$

wherein $A = 7.8/D50 + 1.9 \times D50/(V_{OI})^2$ $B = D50 \times 0.625 + G \times 3$ D50 represents a volume distribution average particle diameter of particles of the negative electrode active material in micron, $V_{OI}$ represents the OI value of the negative electrode layer, G represents the degree of graphitization of the negative electrode active material.

6. The negative electrode plate according to claim 5, wherein the negative electrode layer fulfills the condition:

$$0.112 \leq A/B \leq 0.26 \quad \text{formula VI)}.$$

7. The negative electrode plate according to claim 1, wherein the graphite material is selected from at least one of artificial graphite and natural graphite.

8. The negative electrode plate according to claim 1, wherein the negative electrode active material further comprises one or more of soft carbon, hard carbon, carbon fiber, mesocarbon microbead, silicon-based material, tin-based materials, and lithium titanate.

9. The negative electrode plate according to claim 1, wherein the average particle diameter D50 of the negative electrode active material is 3-25 μm.

10. The negative electrode plate according to claim 9, wherein the average particle diameter D50 of the negative electrode active material is 4-15 μm.

11. The negative electrode plate according to claim 1, wherein the OI value $V_{OI}$ of the negative electrode layer is 1.5-100.

12. The negative electrode plate according to claim 11, wherein the OI value $V_{OI}$ of the negative electrode layer is 1.5-50.

13. The negative electrode plate according to claim 1, wherein the degree of graphitization G of the negative electrode active material is 40%-99%.

14. The negative electrode plate according to claim 13, wherein the degree of graphitization G of the negative electrode active material is 80%-98%.

15. The negative electrode plate according to claim 1, wherein the powder OI value $G_{OI}$ of the negative electrode active material is 0.5-7.

16. The negative electrode plate according to claim 15, wherein the powder OI value $G_{OI}$ of the negative electrode active material is 2-4.5.

17. The negative electrode plate according to claim 1, wherein the press density PD of the negative electrode layer is 0.8 g/cm³-2.0 g/cm³.

18. The negative electrode plate according to claim 17, wherein the press density PD of the negative electrode layer is 1.0 g/cm³-1.6 g/cm³.

19. A secondary battery, comprising the negative electrode plate according to claim 1.

* * * * *